(12) United States Patent
Bernard (10) Patent No.: US 7,297,000 B1
(45) Date of Patent: Nov. 20, 2007

(54) PERIODIC TABLE OF THE ELEMENTS IN THREE DIMENSIONAL FORM

(76) Inventor: Hinsdale Bernard, 324 E. Delaware Rd., Benton Harbor, MI (US) 49022

(*) Notice: Subject to any disclaimer, the term of this patent is extended or adjusted under 35 U.S.C. 154(b) by 748 days.

(21) Appl. No.: 10/723,650

(22) Filed: Nov. 26, 2003

(51) Int. Cl.
*G09B 23/26* (2006.01)
(52) U.S. Cl. .................................. 434/282
(58) Field of Classification Search ............. 434/282
See application file for complete search history.

(56) References Cited

U.S. PATENT DOCUMENTS

| | | |
|---|---|---|
| 3,390,468 A | 7/1968 | Mitchell |
| 3,581,409 A * | 6/1971 | Alexander ............... 434/282 |
| 3,654,712 A | 4/1972 | Bagdasar |
| 3,724,098 A | 4/1973 | McSmith |
| 4,199,876 A | 4/1980 | Katz |
| 5,921,781 A | 7/1999 | Shaw |
| 2002/0072045 A1 * | 6/2002 | Possidento ............... 434/282 |

OTHER PUBLICATIONS

Interactive Periodic Table, Jan. 1, 2003, Attica Cybernetics, pp. 1-2.*
Fernando Dufour, Elemen Tree: A 3-D Periodic Table, 1999, vol. 4, Issue 3, Fresno, California.

* cited by examiner

*Primary Examiner*—Robert E. Pezzuto
*Assistant Examiner*—Cameron Saadat
(74) *Attorney, Agent, or Firm*—Amin, Turocy & Calvin, LLP (57) ABSTRACT

Disclosed is a three dimensional arrangement for the Periodic Table of the Elements that is based on an elliptical rather than rectangular arrangement represented in conventional charts. The three dimensional arrangement contains a continuous unidirectional periodic spiral of objects, the spiral having a substantially elliptical shape, and each object representing a different chemical element; the objects positioned so that chemical elements in a period are in a single spiral loop, and each successive period has a larger circumference than a preceding period; and the objects positioned so that chemical elements in a chemical group are in substantially the same vertical plane.

20 Claims, 6 Drawing Sheets

THE INTERRUPTED RECTANGULAR PERIODIC TABLE

|s-Block| |← d-Block →|← p-Block →|

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| | IA | IIA | IIIB | IVB | VB | VIB | VIIB | VIIIB | VIIIB | VIIIB | IB | IIB | IIIA | IVA | VA | VIA | VIIA | VIIIA |
| 1 | 1 H | | | | | | | | | | | | | | | | | 2 He |
| 2 | 3 Li | 4 Be | | | | | | | | | | | 5 B | 6 C | 7 N | 8 O | 9 F | 10 Ne |
| 3 | 11 Na | 12 Mg | | | | | | | | | | | 13 Al | 14 Si | 15 P | 16 S | 17 Cl | 18 Ar |
| 4 | 19 K | 20 Ca | 21 Sc | 22 Ti | 23 V | 24 Cr | 25 Mn | 26 Fe | 27 Co | 28 Ni | 29 Cu | 30 Zn | 31 Ga | 32 Ge | 33 As | 34 Se | 35 Br | 36 Kr |
| 5 | 37 Rb | 38 Sr | 39 Y | 40 Zr | 41 Nb | 42 Mo | 43 Tc | 44 Ru | 45 Rh | 46 Pd | 47 Ag | 48 Cd | 49 In | 50 Sn | 51 Sb | 52 Te | 53 I | 54 Xe |
| 6 | 55 Cs | 56 Ba | 57* La | 72 Hf | 73 Ta | 74 W | 75 Re | 76 Os | 77 Ir | 78 Pt | 79 Au | 80 Hg | 81 Tl | 82 Pb | 83 Bi | 84 Po | 85 At | 86 Rn |
| 7 | 87 Fr | 88 Ra | 89+ Ac | 104 Rf | 105 Db | 106 Sg | 107 Bh | 108 Hs | 109 Mt | 110 Uun | 111 Uuu | 112 Uub | 113 Uut | 114 Uuq | 115 Uup | 116 Uuh | 117 Uus | 118 Uuo | f-Block

| 58* Ce | 59 Pr | 60 Nd | 61 Pm | 62 Sm | 63 Eu | 64 Gd | 65 Tb | 66 Dy | 67 Ho | 68 Er | 69 Tm | 70 Yb | 71 Lu |
|---|---|---|---|---|---|---|---|---|---|---|---|---|---|
| 90+ Th | 91 Pa | 92 U | 93 Np | 94 Pu | 95 Am | 96 Cm | 97 Bk | 98 Cf | 99 Es | 100 Fm | 101 Md | 102 No | 103 Lr |

FIG. 1

THE UNINTERRUPTED RECTANGULAR PERIODIC TABLE

PERIOD

PERIODIC TABLE OF THE ELEMENTS IN THREE DIMENSIONAL FORM

FIELD OF THE INVENTION

The present invention generally relates to a new rendition of the Periodic Table of the Elements in three dimensional form.

BACKGROUND OF THE INVENTION

Figure 1:
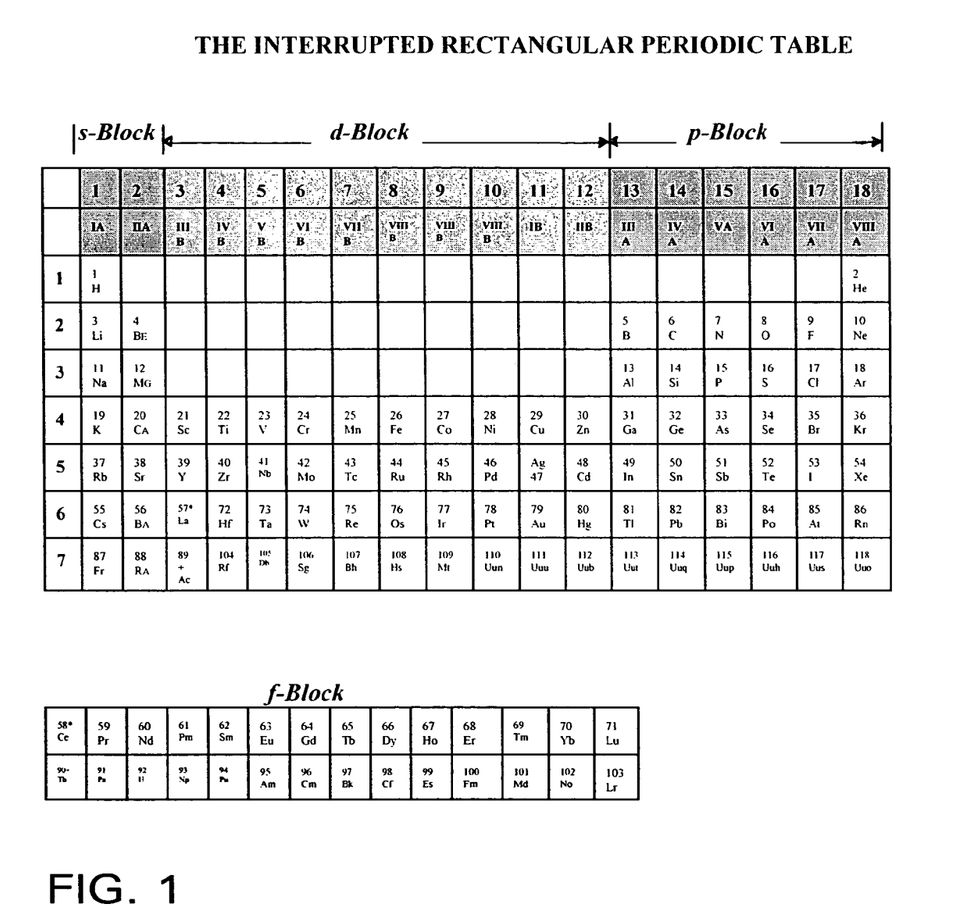
FIG. 1 illustrates a prior art conventional and two dimensional Periodic Table of the Elements.
Figure 2:
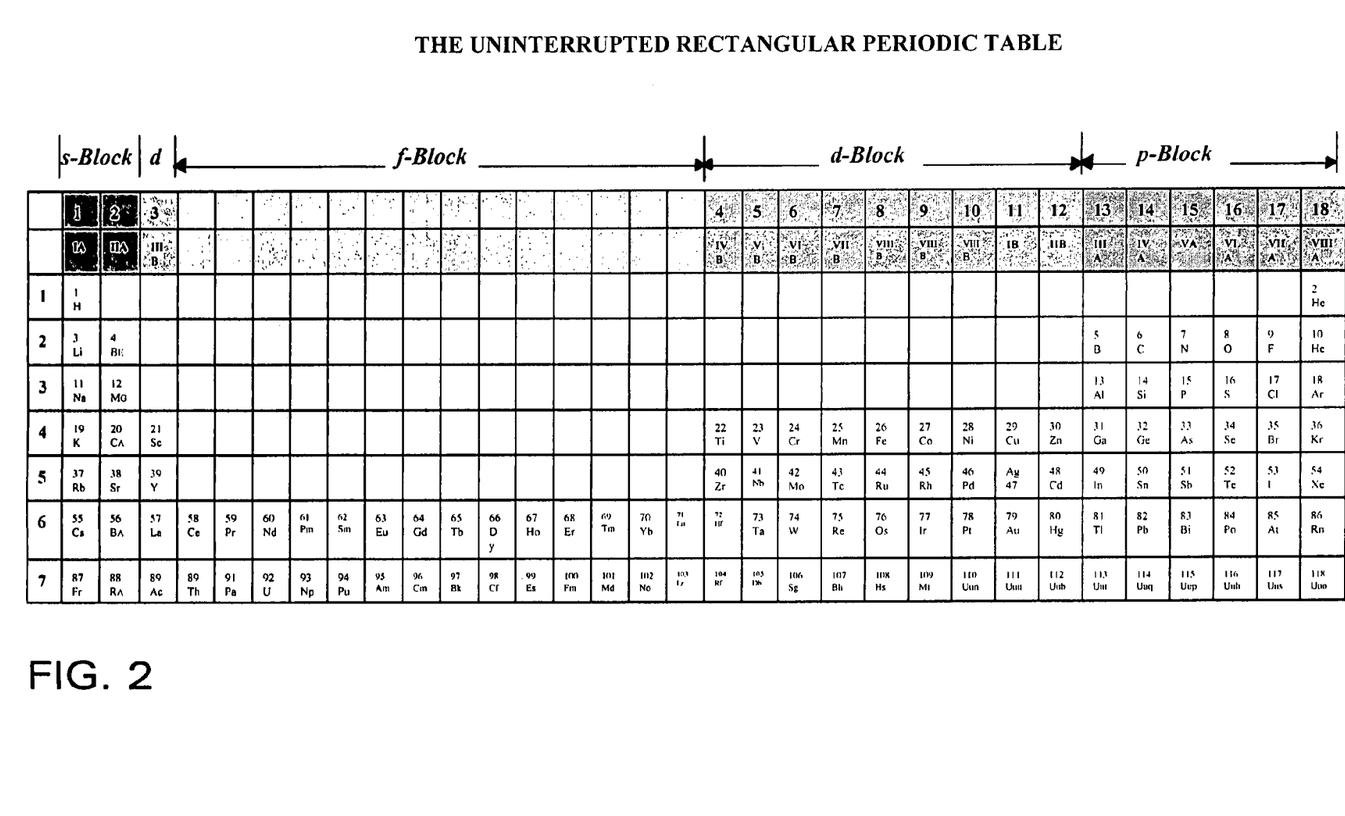
FIG. 2 illustrates a prior art conventional uninterrupted rectangular Periodic Table of the Elements.

The Periodic Table of the Elements is undoubtedly the most elegant organizational chart ever devised. This chart is organized to show the relationships among chemical elements with similar characteristics. This chart facilitates an understanding and prediction of the properties of the elements and how they react with each other to form hundreds of thousands of compounds. A sample conventional Periodic Table of the Elements is shown in FIG. 1. Another sample conventional uninterrupted rectangular Periodic Table of the Elements is shown in FIG. 2.

At present, the Periodic Table is represented in most books and charts in a rectangular form. Periods are the rows that run from left to right. Both the atomic numbers (number of protons) and electrons increase in number from left to right in each Period. The vertical columns represent families of elements that exhibit similar characteristics. These families are called Groups. Elements in the same Group, in general, exhibit similar combining powers (valence), but do not exhibit the same degree of reactivity to other elements.

In 1996, the International Union of Pure and Applied Chemistry (IUPAC) introduced a new notation system of arabic numerals, 1 to 18 for Groups in the s-, p-, and d-Blocks. By this convention, the 14 f-Block elements are not assigned to any Groups. When a principal energy level (shell) receives its full complement of electrons, e.g., inert gases in Group 18 (8A), a new row begins, which is the start of a new Period. For instance, lithium is located at the start of Period 2 and has 1 electron in its outer shell as in Group 1 (1A), and neon, located at the end of Period 2 in Group 18 (8A), has 8 electrons in its completed shell.

The Periodic Table is divided into the following Blocks based on the electron configurations of the elements. These Blocks form large families and the number of elements in each Block is computed by calculating the product of the rows (Periods) and columns (Groups) that make up the Block. Period 1 has only two elements and represents a unique situation. Both hydrogen (1H) and helium (2He) have s-electrons, but helium has a complete outer shell and should be grouped with the other inert gases in Group 18. Therefore, helium can occupy any of the two positions in the Periodic Table. For purposes of calculating the number of elements in the various Blocks, helium will be placed in Group 2 as part of the s-Block. The total number of elements in the Periodic Table can be derived from the following calculation:

| Periods (rows) × Groups (columns) = Number of elements in a Block | | |
| --- | --- | --- |
| s-Block | (7 rows × 2 columns) = | 14 elements |
| p-Block | (6 rows × 6 columns) = | 36 elements |
| d-Block | (4 rows × 10 columns) = | 40 elements |
| f-Block | (2 rows × 14 columns) = | 28 elements |

And the total possible elements for 7 complete Periods is 118 elements.

The transition elements are found in three series in the center of the Periodic Table starting with Group 3. The first series is in Period 4, from scandium (21) to zinc (30). The second series is in Period 5, from yttrium (39) to cadmium (48). The third series found in Period 6 is a bit different. It starts at Group 4 at the element lanthanum (57) and continues to include mercury (80). But the building-up of the series is interrupted immediately after lanthanum by a transition series within a transition series, that is, an inner transition series. The inner series consists of the 14 f-block, rare-earth metals or lanthanides, beginning with cerium (58) and ending with lutetium (71). The transition series therefore begins with lanthanum (57) and ends with mercury (80) to comprise the d-block elements. Similarly, the fourth series occupies the same relative position in Period 7. This transition series begins with actinium (89) and ends with ununbiium (112), but is interrupted immediately after actinium by the 14 inner-transition elements thorium (90) to lawrencium (103) spliced in between. Currently, the inner-transition blocks appear separately in most conventional books and charts. While the conventional Periodic Table of the Elements is elegant, it is possible that a different presentation can facilitate a better understanding of the elements.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Figure 3:
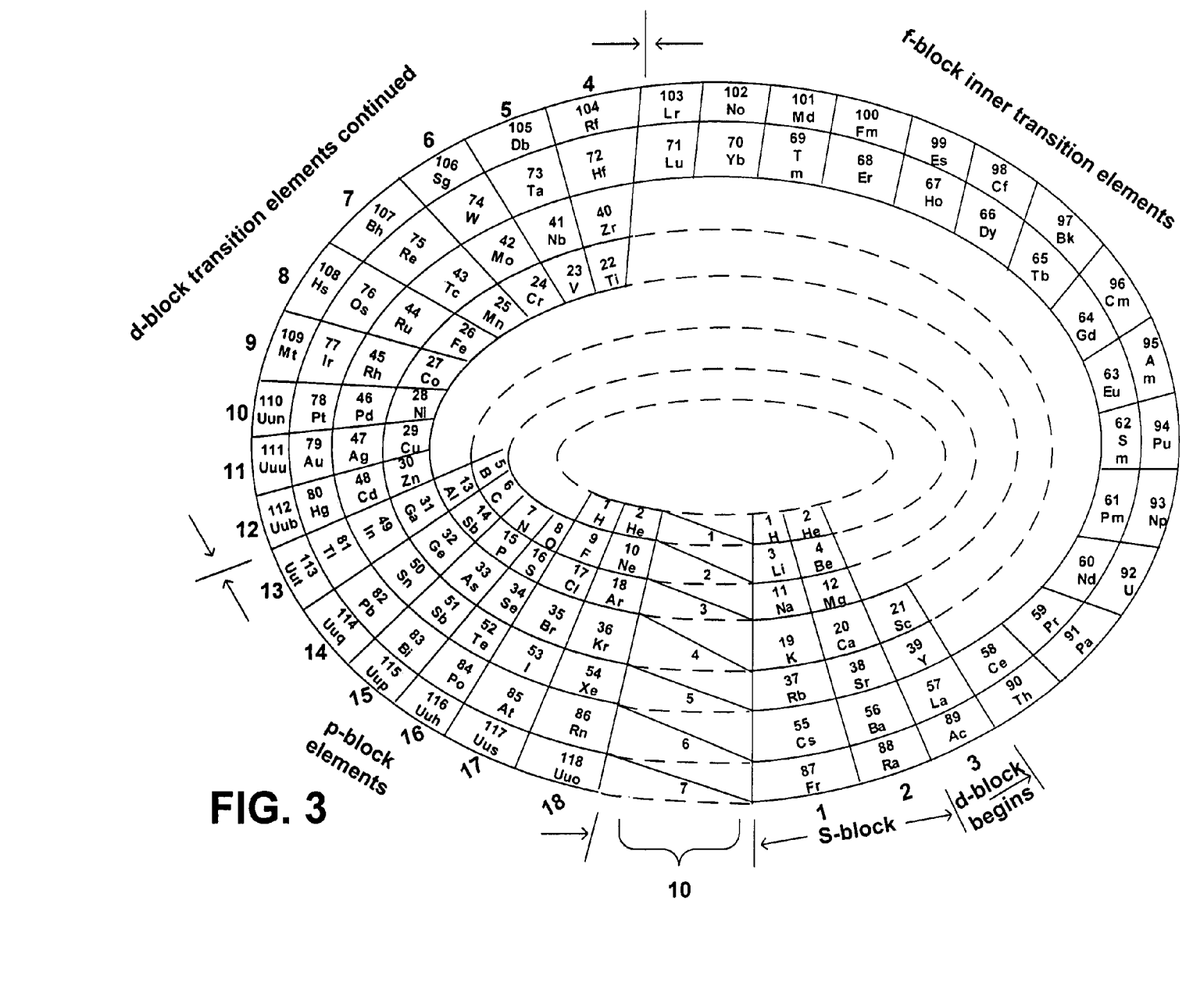
FIG. 3 is a top down view of the elliptical three dimensional periodic arrangement of the chemical elements in one aspect of the present invention.

The present invention provides a new rendition of the Periodic Table of the Elements in three dimensional form that facilitates a better understanding of Chemistry and/or the inter-relationship of the chemical elements. In FIG. 3, the elliptical rendition of the Periodic Table makes possible the spiral arrangement for the three dimensional model of the present invention.

One aspect of the invention relates to a three dimensional arrangement of chemical elements characterized by a continuous unidirectional periodic spiral of objects, the spiral having a substantially elliptical shape, and each object representing a different chemical element; the objects positioned so that chemical elements in a Period are in a single spiral loop, and each successive Period has a larger circumference than a preceding Period; and the objects positioned so that chemical elements in a chemical group are in substantially the same vertical plane. Another aspect of the invention relates to a learning kit containing the three dimensional arrangement of chemical elements and a carrying case.

Yet another aspect of the invention relates to a computer implemented method of generating a three dimensional arrangement of chemical elements with a continuous unidirectional periodic spiral of objects, the spiral having a substantially elliptical shape, and each object representing a different chemical element; the objects positioned so that chemical elements in a Period are in a single spiral loop, and each successive Period has a larger circumference than a preceding Period; and the objects positioned so that chemical elements in a chemical group are in substantially the same vertical plane.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention relates to a three dimensional periodic arrangement of the chemical elements to provide a new rendition of the Periodic Table. The three dimensional periodic arrangement contains a continuous periodic spiral of objects. While the first object of the spiral does not begin at one of the center or fulcrum points, the overall shape of the three dimensional periodic arrangement is spiral like in that each successive Period has a larger radius. The periodic spiral of objects is unidirectional in that elements are presented with increasing atomic numbers or increasing atomic weights. The spiral has a substantially elliptical shape or elliptical shape, not a circular shape. The elliptical shape further facilitates a viewers understanding of the heavier elements.

The spiral may be right handed (clockwise rotation from the center outwards) or left handed (counterclockwise rotation from the center outwards), although a left handed spiral facilitates observing the elements from left to right in ascending atomic number.

Each object of the three dimensional periodic arrangement represents a different chemical element. The chemical elements include H, He, Li, Be, B, C, N, O, F, Ne, Na, Mg, Al, Si, P, S, Cl, Ar, K, Ca, Sc, Ti, V, Cr, Mn, Fe, Co, Ni, Cu, Zn, Ga, Ge, As, Se, Br, Kr, Rb, Sr, Y, Zr, Nb, Mo, Tc, Ru, Rh, Pd, Ag, Cd, In, Sn, Sb, Te, I, Xe, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi, Po, At, Rn, Fr, Ra, Ac, Th, Pa, U, Np, Pu, Am, Cm, Bk, Cf, Es, Fm, Md, No, Lr, Rf, Db, Sg, Bh, Hs, Mt, Uun, Uuu, Uub, Uut, Uuq, Uup, Uuh, Uus, and Uuo and other yet to be discovered elements. This list of chemical elements is presented with increasing atomic numbers/increasing atomic weights.

The three dimensional periodic arrangement may contain all of the listed chemical elements, a subset of the listed chemical elements, or the listed chemical elements with unlisted, anticipated subsequently discovered chemical elements. For example, the three dimensional periodic arrangement may contain from H to about La, from H to about Rn, from H to about Ac, from H to about Lr, from H to about Mt, or from H to about Uuo. The three dimensional periodic arrangement may contain from H to about Mt while omitting one or both subsets of Ce, Pr, Nd, Pm, Sm, Eu, Gd, Tb, Dy, Ho, Er, Tm, Yb, and Lu (the lanthanides) or Th, Pa, U, Np, Pu, Am, Cm, Bk, Cf, Es, Fm, Md, No, and Lr (the actinides).

A period is a row of elements from the conventional Periodic Table. There are seven Periods in the full rendition of the three dimensional periodic arrangement. Typically, all seven Periods are displayed, although in some instances six Periods, five Periods, four Periods, or three Periods may be displayed. For example, H and He make up a period (first Period), while K, Ca, Sc, Ti, V, Cr, Mn, Fe, Co, Ni, Cu, Zn, Ga, Ge, As, Se, Br, and Kr make up another Period (the third Period). The objects positioned so that chemical elements in a Period are in a single spiral loop, and each successive Period has a larger circumference than a preceding Period. A spiral loop is about one rotation or less around the center points of the ellipse.

A single spiral loop may optionally contain one or more "reverses", to accommodate the lanthanide and actinide series of elements. In another embodiment, each of the sixth and seventh Periods contains one reverse, or two reverses. The length of a single spiral loop is the circumference of that particular Period.

Between each Period or spiral loop, a connector may make a vertical drop, drastic if necessary, in order to mitigate the vertical drop of the oval portion of each spiral loop. Alternatively, the connector may make an oblique drop when connecting the successive Periods/spiral loops. In some embodiments, one or more of the spiral loops may be substantially horizontal, or in a substantially horizontal plane. In other embodiments, a connector may make a slight vertical drop between each spiral loop of the Periods.

The objects positioned so that chemical elements in a chemical group are in substantially the same vertical plane. That is, objects representing elements from the same chemical group appear vertically one over the other. Due to spiral shape of the three dimensional periodic arrangement, the objects are not typically directly one over another, as each lower object/element will be further away from the center points of the spiral ellipse. Moreover, as long as the objects/elements of a single chemical group are vertically near each other (not directly or perfectly vertically orientated), the concept of grouping is sufficiently conveyed. Chemical groups include Group 1 (1A), Group 2 (2A), Group 3 (3B), Group 4 (4B), Group 5 (5B), Group 6 (6B), Group 7 (7B), Group 8 (8B), Group 9 (8B), Group 10 (8B), Group 11 (1B), Group 12 (2B), Group 13 (3A), Group 14 (4A), Group 15 (5A), Group 16 (6A), Group 17 (7A), and Group 18 (8A), wherein the IUPAC group number appears first and an old system of group numbers appears in parenthesis.

It is noted that old system Group 8B (corresponding to Groups 8, 9, and of the IUPAC system) contains three columns of elements; beginning with Fe, Co, and Ni. Each of the triads are positioned so that chemical elements in the successive Periods are in substantially the same vertical plane. For example, the elements Fe, Ru, and Os in Periods 4, 5, and 6 are in one vertical plane while the elements Co, Rh, and Ir in Periods 4, 5, and 6 are another vertical plane, and so forth.

The objects may have any suitable shape to represent a chemical element. The objects within a three dimensional periodic arrangement may have the same or different shapes. Examples of shapes include plate-like, sphere, cube, cylindrical, oval, pyramid, polyhedron having seven or more sides, and the like.

The objects may be color coded with one of four different colors to represent one of the four major groups of elements, the four major groups comprising s-block elements, p-block elements, d-block elements, and f-block elements. Alternatively or additionally, the objects may be color coded with one of four different colors to represent one of the four major groups of elements, and within each of the four colors/major groups, each object may have a different shade or tint. In this embodiment, objects of different colors/major groups may have the same shade or tint if they belong to the same group. Still alternatively, the objects may be shape coded with one of four different shapes to represent one of the four major groups of elements.

Different shapes, colors, shades, and/or tints of objects may be employed to differentiate amongst any subset of chemical elements. For example, these distinguishing characteristics may be used to identify the natural physical state of an element (solid, liquid, gas), a chemical subgroup (alkali metal, alkaline earth metal, active metal, transition metal, heavy metal, precious metal, rare earth metal, non-metal, halogen, noble gas, lanthanides, actinides, chemical group, period, and the like). In addition to using shapes, colors, shades, and/or tints of objects to distinguish subgroups of chemical elements from each other, objects can be illuminated selectively.

The objects may have relative physical dimensions that substantially correspond to relative physical dimensions of actual atomic radii of the chemical elements. That is, the objects may have sizes that are substantially proportionate to actual atomic radii of the elements. However, since the actual atomic radii of fluorine and cesium, for example, are about 0.5 Å and about 2.6 Å, respectively, relative scaling can be employed to facilitate useful and aesthetic appearance of the three dimensional periodic arrangement.

Another aspect of the present invention is to provide a hands-on teaching/learning kit, that can facilitate the understanding of the basics of the chemical elements, in particular, and stimulate interest in science, in general. This means that the present invention can be used by students and their instructors from elementary school to the college level. As such, it can be produced as an individual teaching/learning kit for use in the classroom or at home, and even in the form of an exciting toy kit for younger children to play with at home and learn vicariously about the elements.

The teaching/learning kit contains a physical model of the three dimensional periodic arrangement and a carrying case to store the three dimensional arrangement of chemical elements. In this connection, the three dimensional periodic arrangement may be storable, and detachable to facilitate storage. The teaching/learning kit is a self contained apparatus from which one may assemble the three dimensional periodic arrangement of the elements.

Another aspect of the present invention is the provision of a version in which one or more of the objects/elements can each "talk,", meaning that a selected object/element has electronically recorded information about itself which can be retrieved with an appropriate play back device at the press of a button or some other mechanism. Alternatively, the base structure supporting the objects/elements can provide verbal information concerning an object/element of interest in response to suitable stimuli.

The three dimensional periodic arrangement may be constructed so that it can rotate whereby an observer can view the entire device from a single position. In this embodiment, a manual or electrically motorized central shaft that can rotate the entire assembly to establish various viewing perspectives.

The three dimensional periodic arrangement may be formed on a display device, such as a computer monitor. Computer generated graphics and/or appropriate software required to form such an image in a display device are included within the scope of this invention.

The three dimensional periodic arrangement of the present invention can be stored in a handy case for housing all the parts of the kit so that an individual can transport the device with ease and assemble and dissemble the three dimensional periodic arrangement at will. The three dimensional periodic arrangement of the present invention can also be stored in a computer memory, or computer readable device, such as a disk, memory stick, or other digital technology.

The three dimensional periodic arrangement owes its existence to the development of a new Periodic Chart of the elements that can facilitate a better understanding of Chemistry. This rendition of the periodic spiral departs radically from the rectangular versions in current use in that it builds up in a continuous and unidirectional manner from element of atomic number 1 to 118 without any interruptions. The three dimensional periodic arrangement is now described with reference to FIGS. 3 to 6.

FIG. 3 is a Chart with a top down view depicting a continuous periodic elliptical spiral of the elements. The elliptical rendition of the Periodic Table, as viewed from a top down perspective, further illustrates the spiral arrangement for the three dimensional model in one aspect of the present invention. The chemical groups are indicated with numeric designations 1 to 18 around portions of the circumference of the ellipse. The region of the continuous periodic spiral that connects the Periods and the chemical groups simultaneously is herein termed the Period-Group Interchange Zone 10. This feature contributes to the unidirectional aspect of the continuous periodic spiral of the elements. The Periods are also indicated with arabic numerals 1 to 7 in the Period-Group Interchange Zone 10. The Blocks are easily discernable. For example, the s-block elements are followed by the d-block transition elements, which are interrupted by the f-block inner transition elements. The remaining d-block transition elements then follow, and the arrangement is complete with the p-block elements.

Figure 4:
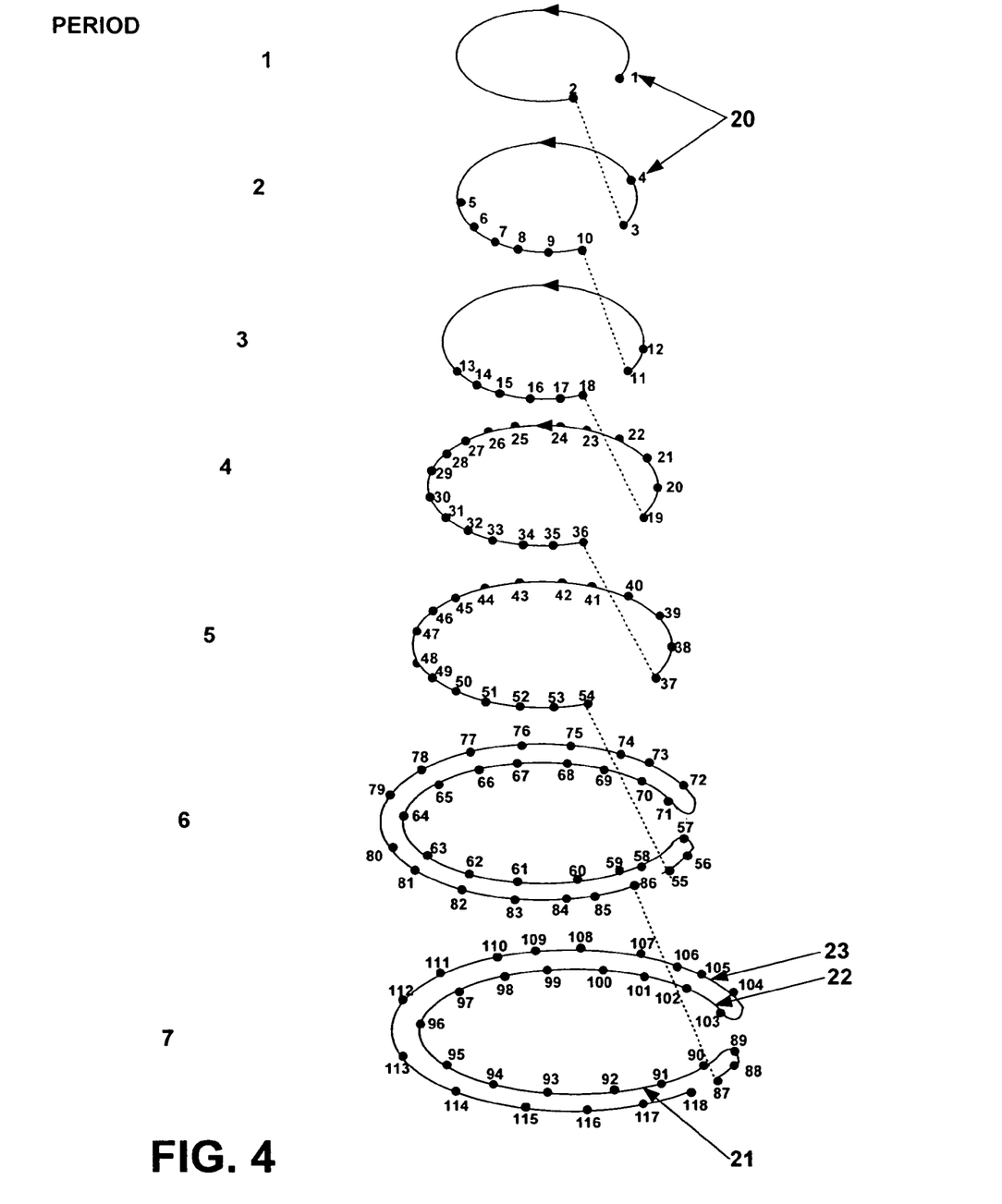
FIG. 4 illustrates an exemplary embodiment of the three dimensional periodic arrangement of the chemical elements in one aspect of the present invention where the elements are positioned by atomic numbers.

FIG. 4 illustrates the basic layout of the elements in the seven Periods of the Continuous Periodic Spiral by atomic numbers 20. In order to accommodate all 32 elements in Periods 6 and 7, the 14 inner transition elements (58 to 71 and 90 to 103) are made to snake or reverse inwards literally 21 in a concentric ellipse 22 to the ellipse containing the other 18 elements 23 in the Period. This arrangement saves space dramatically. FIG. 4 also illustrates how the elements in the Periodic Spiral are to be lined up in a substantially vertical manner by chemical groups. For example, Group 18 (8A) elements with atomic numbers 2, 10, 18, 36, 54, 86, 118 illustrate this feature handsomely.

Figure 5:
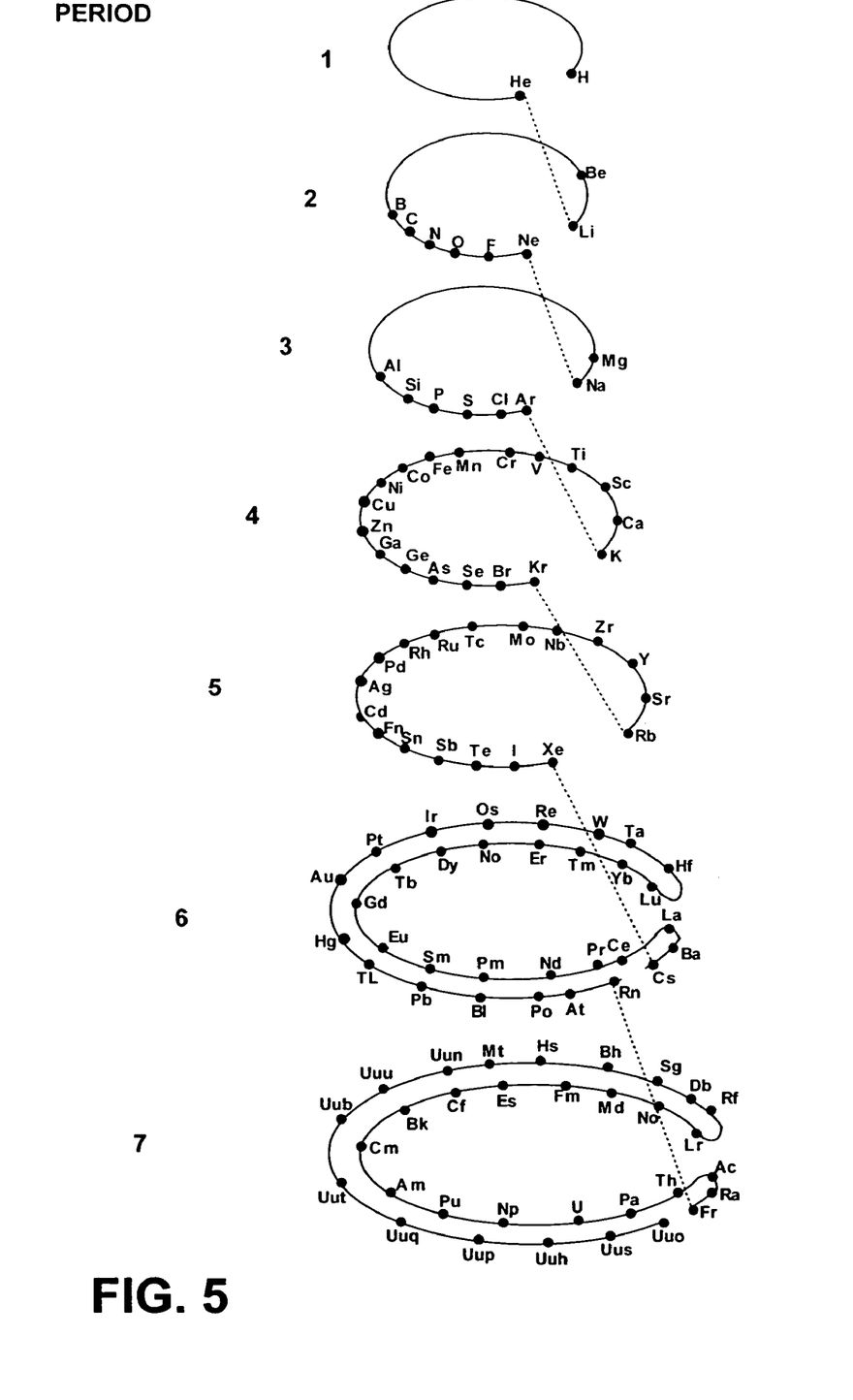
FIG. 5 illustrates an exemplary embodiment of the three dimensional periodic arrangement of the chemical elements in one aspect of the present invention where the elements are positioned by symbols.

FIG. 5 illustrates the basic layout of the elements in the 7 Periods of the Continuous Periodic Spiral by symbols 32. FIGS. 4 and 5 are identical except that they portray atomic numbers and symbols of the elements, respectively. They are done separately to avoid overcrowding the limited spaces with both the numbers and symbols of the elements.

Figure 6:
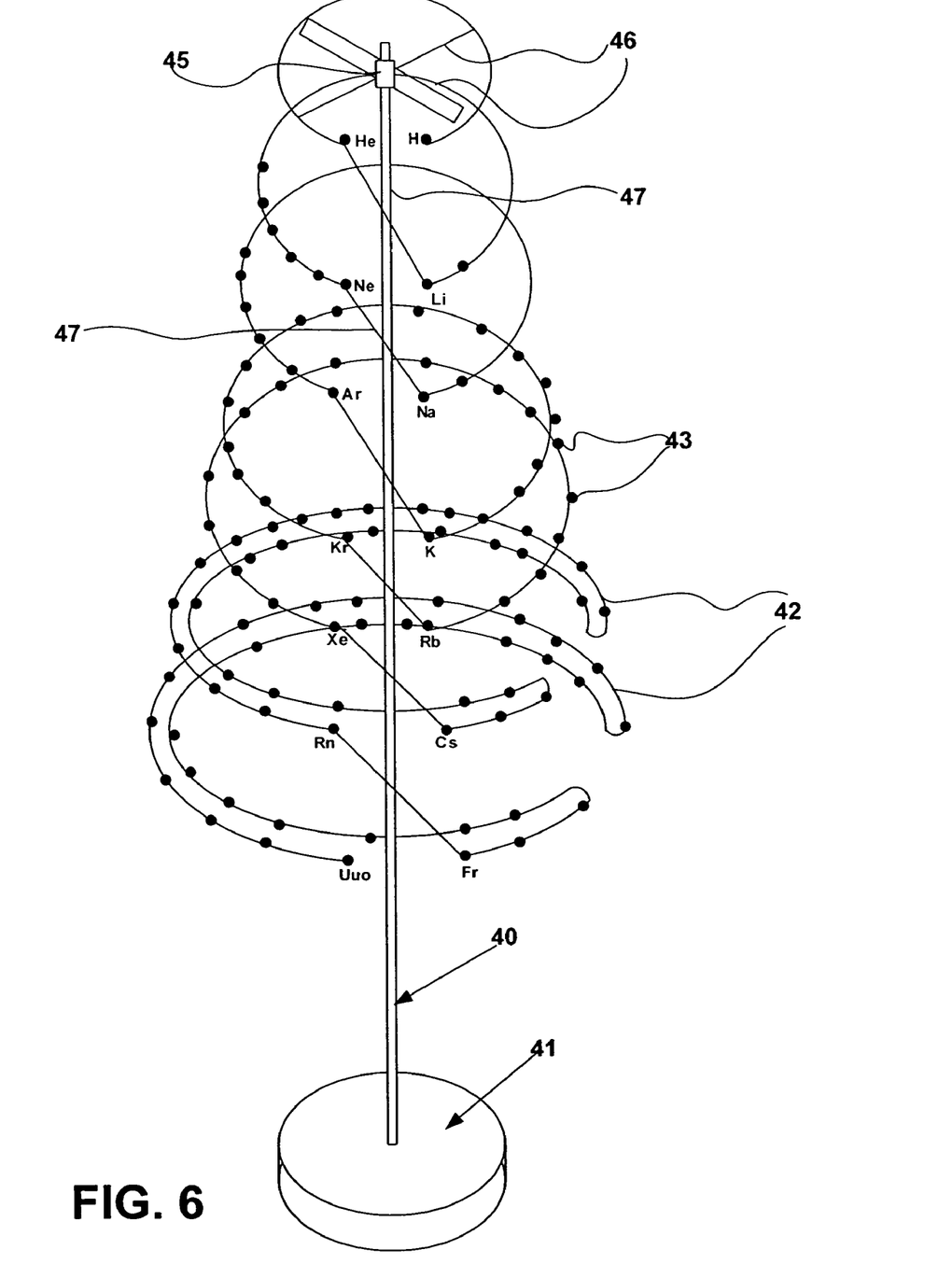
FIG. 6 illustrates an exemplary structural framework for supporting the assembly of the elements.

FIG. 6 illustrates an example of a structural model for supporting the assembly of objects (shown as black dots) representing the elements. The model contains a central shaft 40 that can be attached to a supporting base 41. The central shaft 40 may be comprised of sections that can be collapsed or separated for convenient storage in a carrying case. The elliptical ribs 42 representing the Periods are made of any suitable material such as wood, rigid plastic or metallic wire-like material to support the objects of varying sizes representing the elements 43. The elliptical ribs do not complete a 360° section of the ellipse but are each left with a gap that defines the Period-Group Interchange Zone. Each supporting rib is held in place on the central shaft by a central collar 45 that is connected to the central shaft and is connected to the rib by connectors 46. The supporting ribs increase in diameter as the Periods become larger. Continuity is established between Periods and Groups through the Period-Group connectors 47.

As an alternative to FIG. 6, each object or element may be supported by an arm connected to the central shaft 40, so long as the objects are maintained in a general elliptical spiral.

The three dimensional periodic arrangement is operational with numerous general purpose or special purpose computing system environments or configurations. Examples of well known computing systems, environments, and/or configurations that may be suitable for providing the three dimensional periodic arrangement include personal computers, server computers, hand or laptop devices, multiprocessor systems, microprocessor systems. Additional examples include set top boxes, programmable consumer electronics, network PCs, minicomputers, mainframe computers, distributed computing environments that include any of the above systems or devices, and the like.

The three dimensional periodic arrangement may be described in the general context of computer-executable instructions, such as program modules, being executed by a computer. Generally, program modules include routines, programs, objects, components, data structures, etc. that perform particular tasks or implement particular abstract data types. The three dimensional periodic arrangement may also be provided in distributed computing environments where tasks are performed by remote processing devices that are linked through a communications network. In a distributed computing environment, program modules may be located in both local and remote computer storage media including memory storage devices.

A method of producing the three dimensional periodic arrangement can be computer-implemented on a suitable device. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs for providing the three dimensional periodic arrangement can be a part of a computer system, a computer, or a computerized device.

The present invention also includes a computer readable medium having computer executable instructions stored thereon to provide a three dimensional arrangement of chemical elements as described above. Still further the present invention also includes a computer readable medium having a data structure stored thereon to provide a three dimensional arrangement of chemical elements as described above.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A three dimensional arrangement of chemical elements, comprising:
    a continuous unidirectional periodic spiral of objects, the spiral having a substantially elliptical shape, and each object representing a different chemical element;
    the objects positioned so that chemical elements in a Period are in a single spiral loop, and each successive Period has a larger circumference than a preceding Period; and
    the objects positioned so that chemical elements in a chemical group are in substantially the same vertical plane.

2. The three dimensional arrangement of claim 1, wherein the objects individually have a shape selected from the group consisting of plate-like, sphere, cube, cylindrical, oval, pyramid, polyhedron having seven or more sides.

3. The three dimensional arrangement of claim 1, wherein the objects represent chemical elements from H to about Mt.

4. The three dimensional arrangement of claim 1, wherein the objects are color coded with one of four different colors to represent one of four major groups of elements, the four major groups comprising s-block elements, p-block elements, d-block elements, and f-block elements.

5. The three dimensional arrangement of claim 1, wherein the objects have relative physical dimensions that substantially correspond to relative physical dimensions of actual atomic radii of the chemical elements.

6. The three dimensional arrangement of claim 1, wherein the objects are positioned within seven Periods.

7. The three dimensional arrangement of claim 1, wherein the objects are positioned within seven Periods, and the single spiral loop of the sixth Period and the single spiral loop of the seventh Period each comprise a reverse.

8. The three dimensional arrangement of claim 1, wherein the objects are positioned within seven Periods, and the single spiral loop of the sixth Period and the single spiral loop of the seventh Period each comprise two reverses.

9. The three dimensional arrangement of claim 1, wherein the objects are color coded with one of four different colors to represent one of alkali metals, alkaline earth metals, transition metals, rare earth metals, non-metals, and noble gases.

10. A learning kit, comprising:
    a storable and assemblable three dimensional arrangement of chemical elements comprising
        a continuous unidirectional periodic spiral of objects, the spiral having a substantially elliptical shape, and each object representing a different chemical element;
        the objects positioned so that chemical elements in a Period are in a single spiral loop, and each successive Period has a larger circumference than a preceding Period; and
        the objects positioned so that chemical elements in a chemical group are in substantially the same vertical plane; and
    a carrying case to store the three dimensional arrangement of chemical elements.

11. The three dimensional arrangement of claim 10, the storable and detachable three dimensional arrangement of chemical elements further comprising an audio source for providing audio information regarding the chemical elements.

12. The three dimensional arrangement of claim 10, wherein each of the objects illuminate in response to suitable stimuli.

13. The three dimensional arrangement of claim 10, wherein the chemical group comprises Group 1, Group 2, Group 3, Group 4, Group 5, Group 6, Group 7, Group 8, Group 9, Group 10, Group 11, Group 12, Group 13, Group 14, Group 15, Group 16, Group 17, and Group 18.

14. The three dimensional arrangement of claim 10, wherein the objects represent chemical elements from H to about Uuo.

15. The three dimensional arrangement of claim 10, wherein the objects are color coded with one of four different colors to represent one of four major groups of elements, the four major groups comprising s-block elements, p-block elements, d-block elements, and f-block elements.

16. The three dimensional arrangement of claim 10, wherein the objects have relative physical dimensions that substantially correspond to relative physical dimensions of actual atomic radii of the chemical elements.

17. The three dimensional arrangement of claim 10, wherein the objects are positioned within seven Periods.

18. The three dimensional arrangement of claim 10, the objects are color coded with one of four different colors to represent one of alkali metals, alkaline earth metals, transition metals, rare earth metals, non-metals, and noble gases.

19. A computer implemented method of generating a three dimensional arrangement of chemical elements, comprising:

a continuous unidirectional periodic spiral of objects, the spiral having a substantially elliptical shape, and each object representing a different chemical element;

the objects positioned so that chemical elements in a Period are in a single spiral loop, and each successive Period has a larger circumference than a preceding Period; and the objects positioned so that chemical elements in a chemical group are in substantially the same vertical plane.

20. The method of claim 19, wherein the method is performed by execution of a computer program by a processor from a computer-readable medium.

* * * * *